(12) United States Patent
Biswas et al.

(10) Patent No.: US 12,204,303 B2
(45) Date of Patent: Jan. 21, 2025

(54) AUTOMATED STRATEGY PLANNING FOR SEVERE WEATHER-DRIVEN PROACTIVE OUTAGE AND RESTORATION EVENTS IN A POWER GRID

(71) Applicant: GENERAL ELECTRIC COMPANY, Schenectady, NY (US)

(72) Inventors: Saugata Swapan Biswas, Kirkland, WA (US); Sridevi Bayyapuneedi, Bothell, WA (US); Monisha Raju, Bothell, WA (US); Srinivas Musunuri, Redmond, WA (US)

(73) Assignee: GE DIGITAL HOLDINGS LLC, San Ramon, CA (US)

( * ) Notice: Subject to any disclaimer, the term of this patent is extended or adjusted under 35 U.S.C. 154(b) by 287 days.

(21) Appl. No.: 17/723,688

(22) Filed: Apr. 19, 2022

(65) Prior Publication Data

US 2023/0333528 A1 Oct. 19, 2023

(51) Int. Cl.
*G05B 19/042* (2006.01)
*H02J 3/00* (2006.01)

(52) U.S. Cl.
CPC ............ *G05B 19/042* (2013.01); *H02J 3/001* (2020.01)

(58) Field of Classification Search
CPC ................................ G05B 19/042; H02J 3/001

USPC ......................................................... 700/295
See application file for complete search history.

(56) References Cited

U.S. PATENT DOCUMENTS

| | | | | |
|---|---|---|---|---|
| 2005/0096856 | A1* | 5/2005 | Lubkeman | G06Q 50/06 702/58 |
| 2015/0039145 | A1* | 2/2015 | Yang | G05B 13/02 700/291 |
| 2016/0276831 | A1* | 9/2016 | Karlak | G06Q 50/06 |
| 2017/0256153 | A1* | 9/2017 | Klein | H02J 13/00034 |
| 2019/0179053 | A1* | 6/2019 | Shafer | G06N 5/048 |
| 2019/0260230 | A1 | 8/2019 | Biswas et al. | |

\* cited by examiner

*Primary Examiner* — Jigneshkumar C Patel
(74) *Attorney, Agent, or Firm* — Buckley, Maschoff & Talwalkar LLC

(57) ABSTRACT

Provided is a system and method that can determine the timing and sequence of transmission assets on a power grid to be outaged and/or restored based on severe weather. In one example, the method may include selecting a group of transmission assets of a power grid for outage, receiving forecasted weather conditions for a geospatial area that includes the group of transmission assets, determining an outage time and priority among the group of transmission assets based on geospatial locations of the forecasted weather conditions and geospatial locations of the group of transmission assets, and generating a sequence of instructions for powering down the group of transmission assets based on the determined outage time and priority among the group of transmission assets and storing the sequence of instructions in memory.

20 Claims, 13 Drawing Sheets

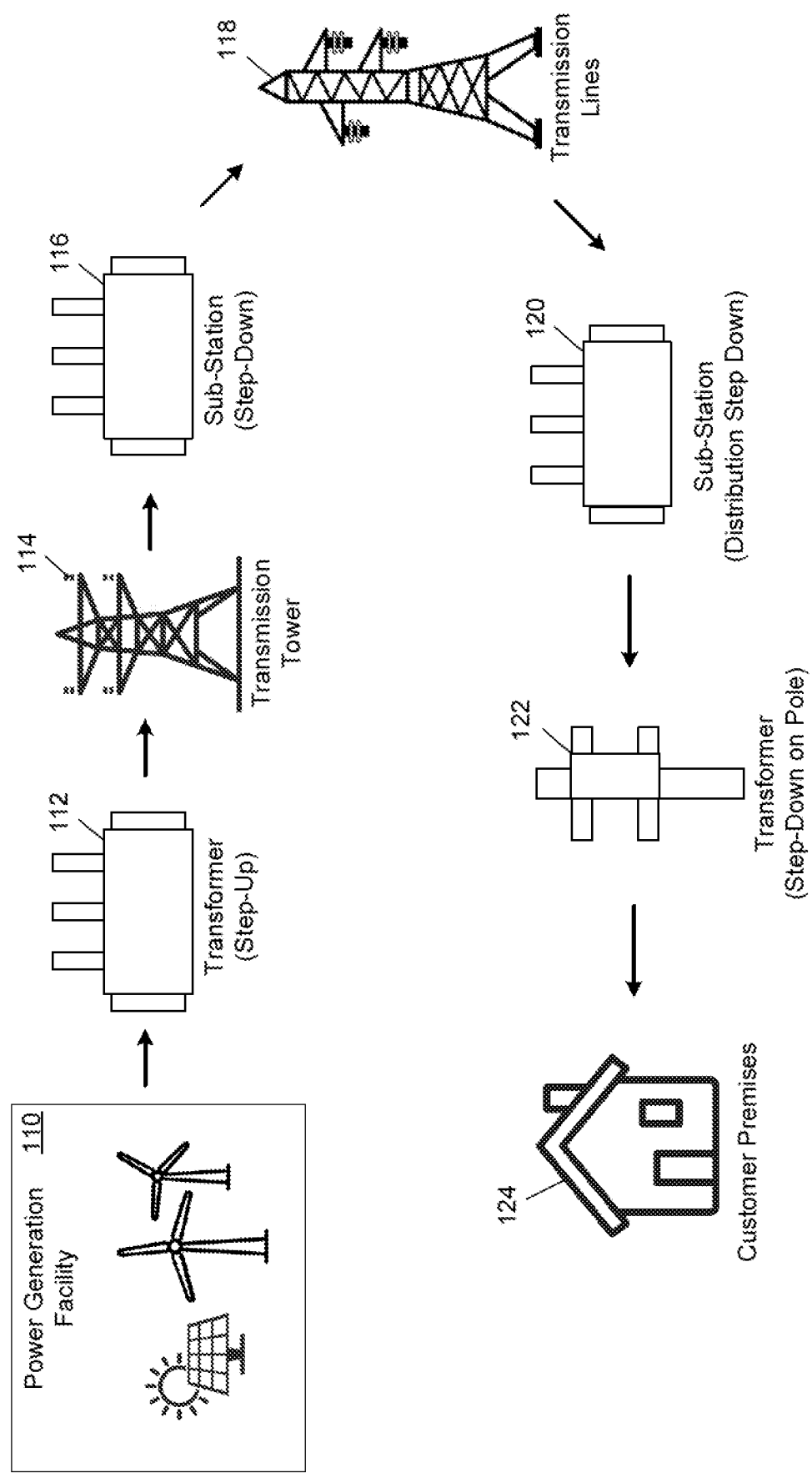

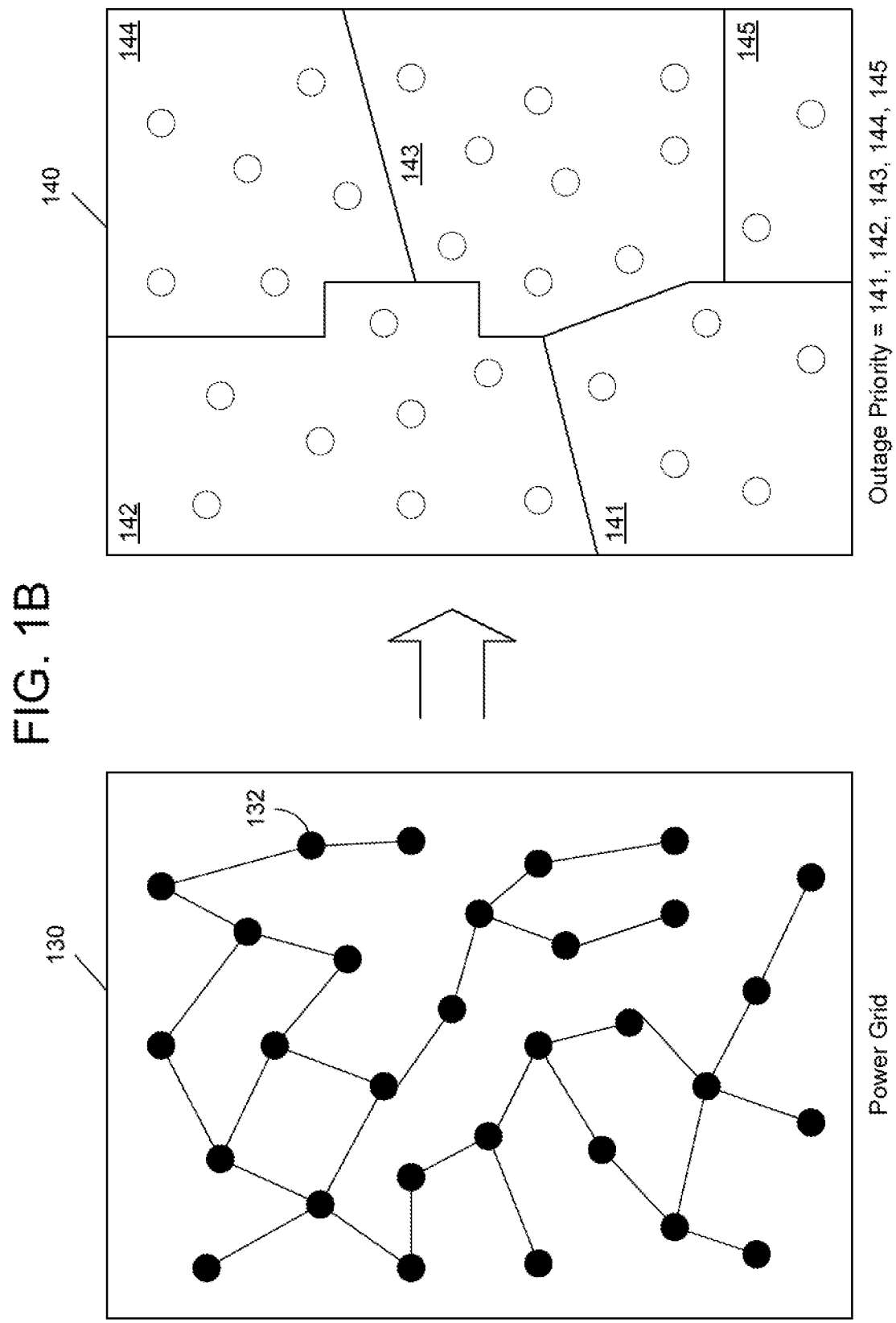

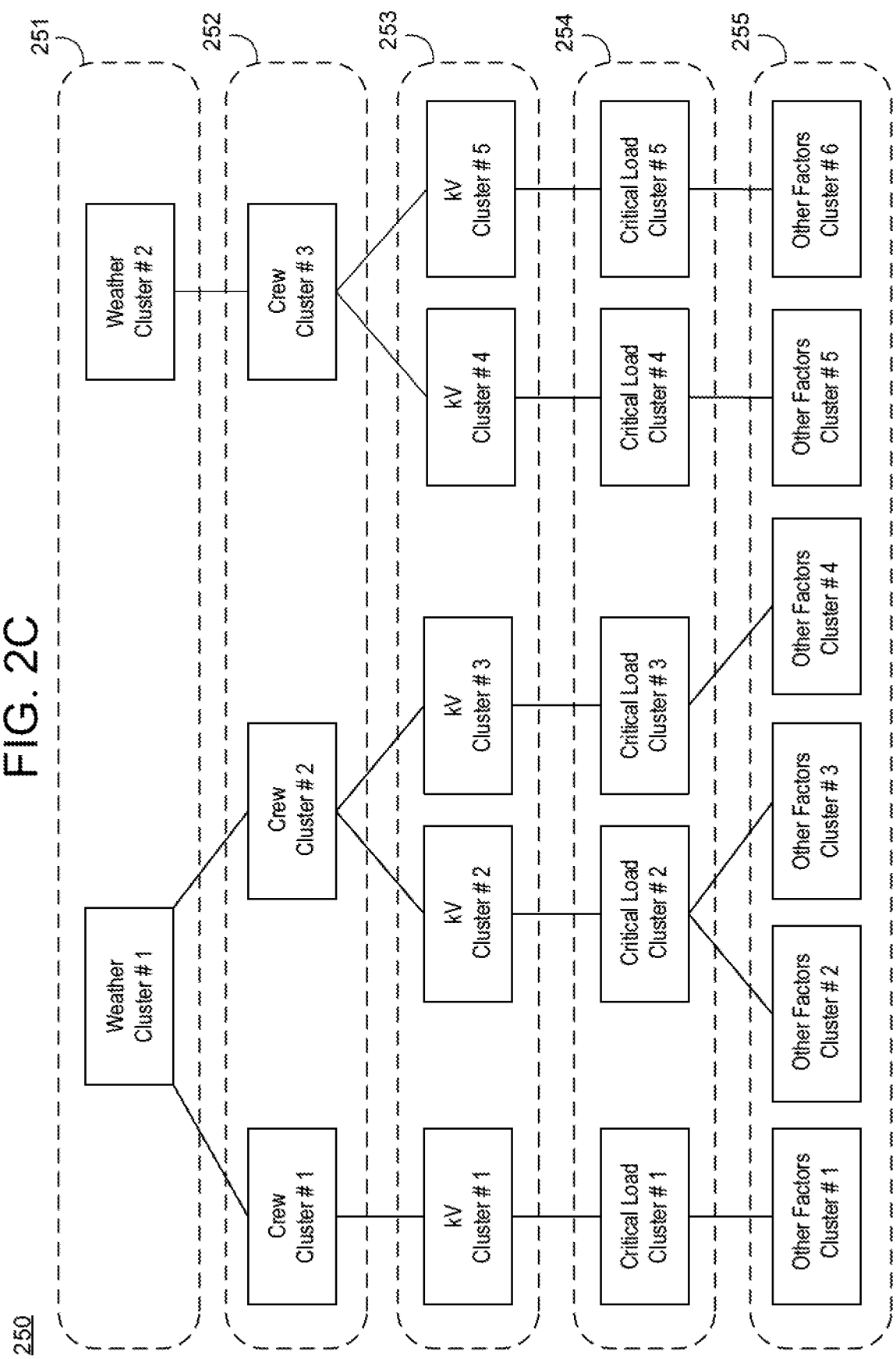

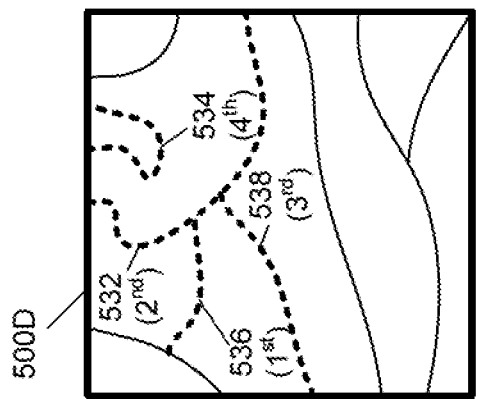
FIG. 5D (Output Plan)
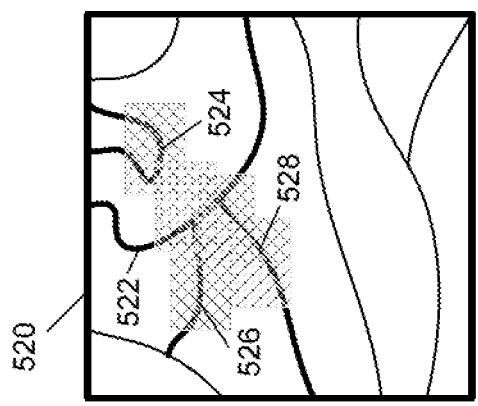
FIG. 5C (Identify Lines)
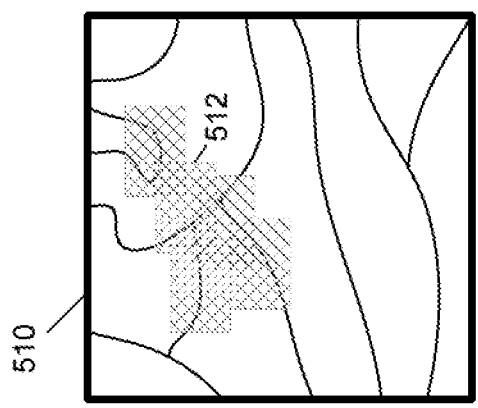
FIG. 5B (Weather Forecast)
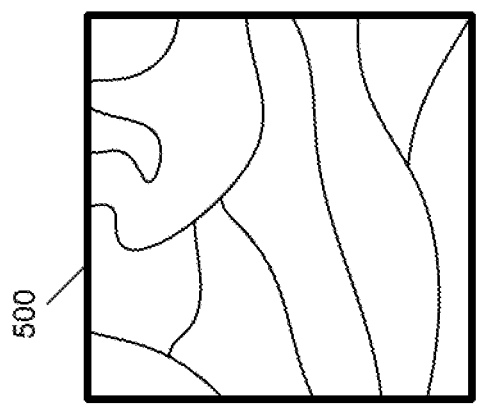
FIG. 5A (Grid)

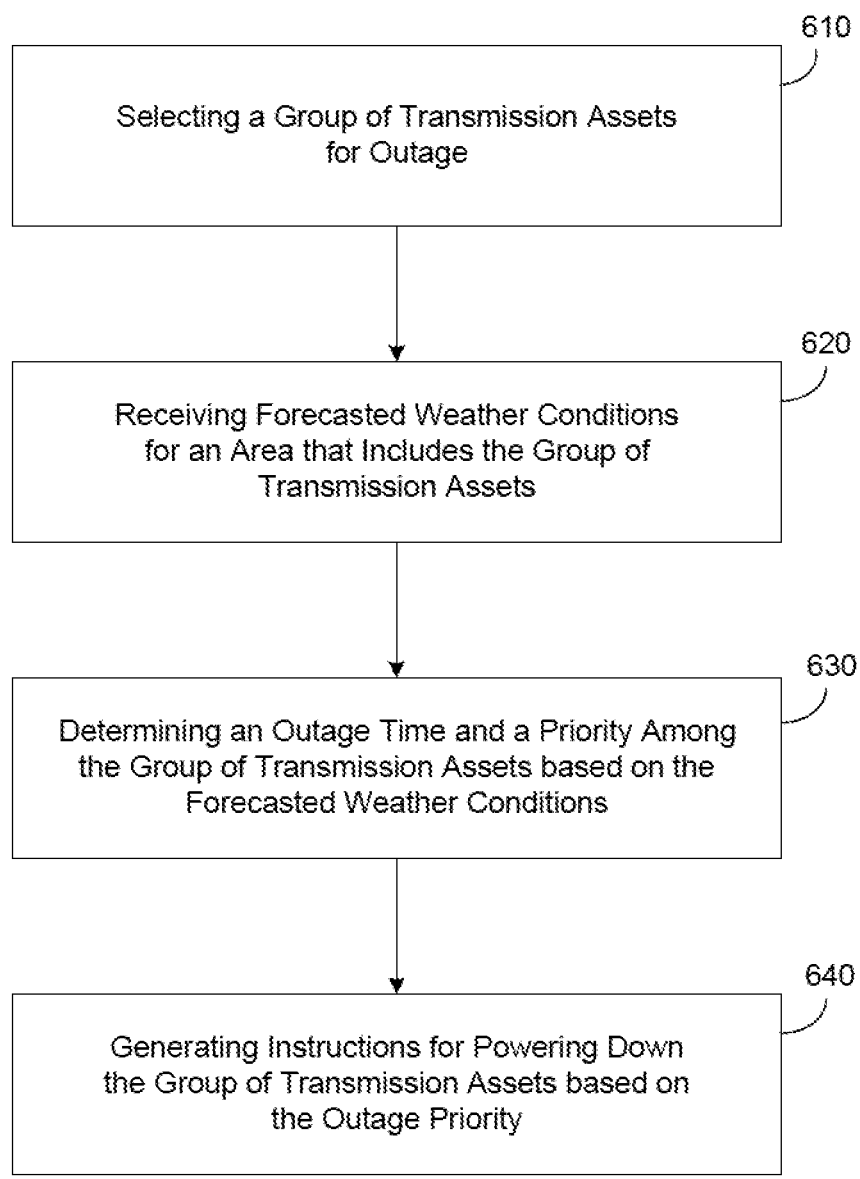

AUTOMATED STRATEGY PLANNING FOR SEVERE WEATHER-DRIVEN PROACTIVE OUTAGE AND RESTORATION EVENTS IN A POWER GRID

BACKGROUND

Emergency operations on a power grid are often activated due to severe weather such as storms, hurricanes, wildfires, and the like. During such emergency operations, a portion of the power grid may be powered down thereby creating an outage. When the emergency has ended, the portion of the power grid may have the power restored. Some of the most critical factors in the success of an emergency outage and/or restoration operations are the time and sequence of the respective outage events or the respective restoration events. However, the current planning systems for power grids do not account for the non-power system factors such as geospatial location of the power grid assets, corresponding weather conditions in and around those locations, field crew risk inspection inputs, load criticality, etc. along with various power system factors for an automated decision support mechanism for creating optimal strategies for such emergency events. Therefore, creating a successful sequence of steps to perform an outage that does not cause a blackout/brownout or which does not unnecessarily turn off too much power and does not risk public safety at the same time can be a difficult process.

SUMMARY

The example embodiments are directed to a system that can automatically determine the timing and the sequence in which a group of transmission assets should be outed/restored based on forecasted weather conditions. For example, the system can compare the geospatial location of forecasted weather events to geospatial locations of transmission assets (e.g., transmission lines, transformers, etc.) and determine a sequence in which the transmission assets should be outed and the times at which such outage actions should be performed. Likewise, the system can compare the geospatial location of the forecasted weather events to the geospatial locations of the transmission assets to determine the time and the sequence in which the transmission assets should be restored and the times at which such restoration actions should be performed.

In an aspect of an example embodiment, provided is a computing system that may include a memory, and a processor configured to select a group of transmission assets of a power grid for outage, receive forecasted weather conditions for a geospatial area that includes the group of transmission assets, determine an outage priority among the group of transmission assets based on geospatial locations of the forecasted weather conditions and geospatial locations of the group of transmission assets, and generate a sequence of instructions for powering down the group of transmission assets based on the determined outage priority among the group of transmission assets and storing the sequence of instructions in the memory.

In another aspect of an example embodiment, provided is a method that may include selecting a group of transmission assets of a power grid for outage, receiving forecasted weather conditions for a geospatial area that includes the group of transmission assets, determining an outage time and priority among the group of transmission assets based on geospatial locations of the forecasted weather conditions and geospatial locations of the group of transmission assets, and generating a sequence of instructions for powering down the group of transmission assets based on the determined outage priority among the group of transmission assets and storing the sequence of instructions in memory.

In another aspect of an example embodiment, provided is a non-transitory computer-readable storage medium may include instructions for a method that may include selecting a group of transmission assets of a power grid for outage, receiving forecasted weather conditions for a geospatial area that includes the group of transmission assets, determining an outage time and priority among the group of transmission assets based on geospatial locations of the forecasted weather conditions and geospatial locations of the group of transmission assets, and generating a sequence of instructions for powering down the group of transmission assets based on the determined outage priority among the group of transmission assets and storing the sequence of instructions in memory.

Other features and aspects may be apparent from the following detailed description taken in conjunction with the drawings and the claims.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

FIG. 1A is a diagram illustrating a power system for distributing electricity to a customer in accordance with an example embodiment.

FIG. 1B is a diagram illustrating sections of a power grid that are powered down in accordance with example embodiments.

FIG. 2C is a diagram illustrating a process of clustering to identify the sections within the grid being powered down in accordance with example embodiments.

FIGS. 5A-5D are diagrams illustrating a process of selecting transmission lines for outage or restoration based on severe weather in accordance with example embodiments.

FIG. 6 is a diagram illustrating a method of determining an outage sequence for a group of transmission assets in accordance with an example embodiment.

Figure 2A:
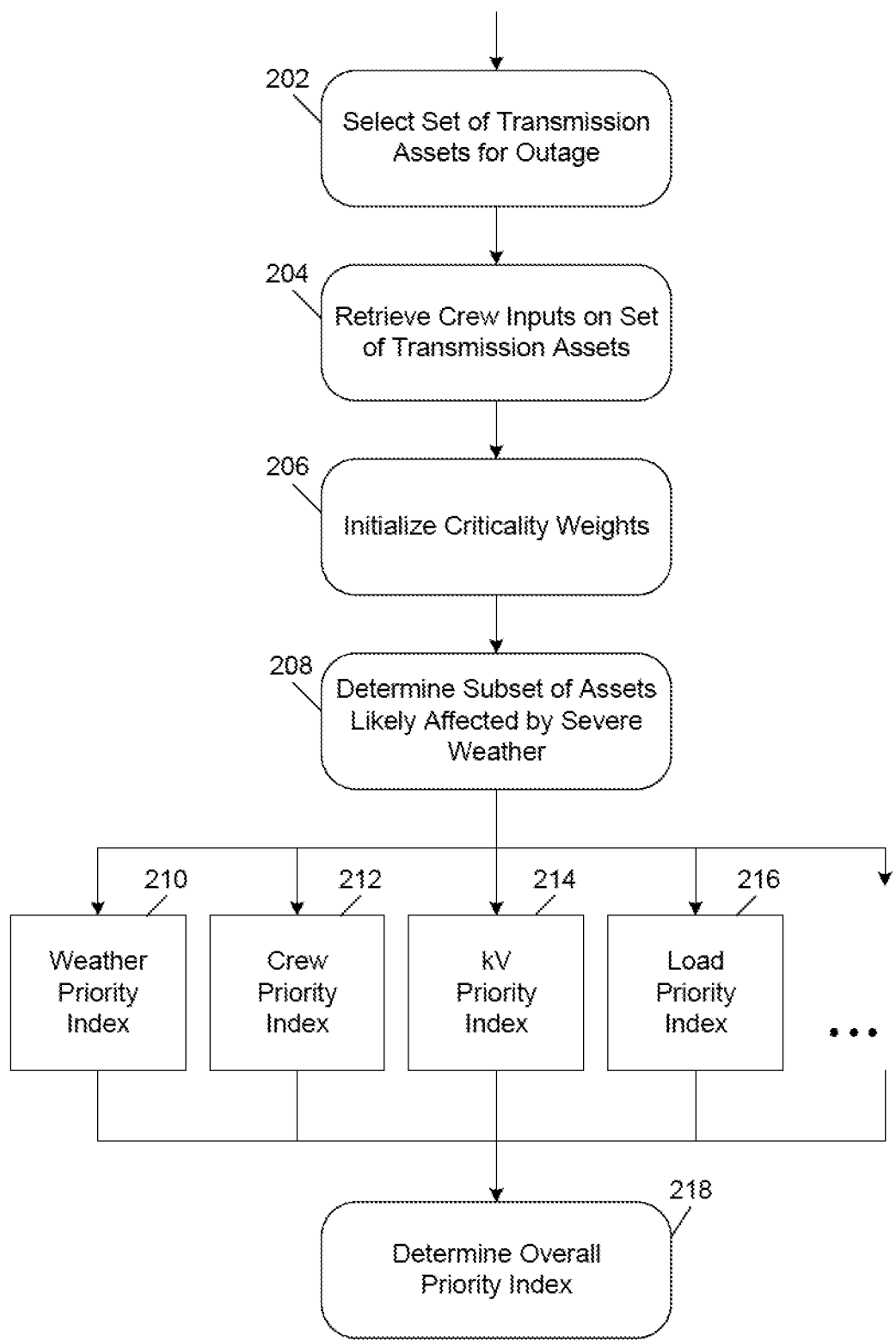
FIG. 2A is a diagram illustrating a process of determining an outage time and sequence for transmission assets based on severe weather in accordance with example embodiments.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown but is to be accorded the widest scope consistent with the principles and features disclosed herein.

The example embodiments are directed to a host application, such as used by an emergency management system, in which data-driven algorithms use non-power systems data (e.g., geospatial data of transmission assets, geospatial data and timing data of forecasted weather data, ground and aerial crew inspection inputs, load criticality factors, etc.) along with power systems data (e.g., information about transmission lines, substation equipment, etc.) in a scientific manner to automatically determine a sequence of outaging and/or restoring power system equipment.

In some embodiments, the system may rank power system equipment (e.g., transmission lines, etc.) for weather driven emergency outage and restoration timing and sequence planning. Such rankings may be based on the change in geospatial patterns of severe weather conditions as well as the timing of such conditions and the geospatial transposition of the transmission lines that traverse through large stretches of land and are most exposed and vulnerable to bad weather conditions. Furthermore, the system may provide outage and restoration ranking of transmission assets based on crew inspection inputs. Crew inspection inputs are based on different risk factor assessments such as proximity of transmission assets (such as transmission lines) to vegetation, proximity to residential communities, proximity to dry fuel on the ground, poor asset maintenance condition, and the like.

In some embodiments, the system may provide outage and restoration timing and ranking of transmission assets based on load criticality factors. Load criticality factors typically include a quantitative measure of the impact of outages and/or risk of not outaging transmission assets on emergency services/loads (such as hospitals, airports, fire services, police, etc.), commercial load centers, cost of living, residential population, etc. In some embodiments, the system may also provide outage and restoration ranking of transmission assets based on power system factors such as voltage level, nominal loading, etc. Furthermore, the system may consolidate some or all of the ranking indices of all the different attributes to generate an overall prioritization ranking and a tentative time of transmission equipment outage and/or restoration in waves or clusters.

FIG. 1A illustrates a power delivery system 100 showing components that can facilitate the generation of power and the process of delivering power (e.g., delivering energy, electricity) to customer premises 124. Electric power can be generated at a power generation facility 110, passed to a transformer 112 and then carried by transmission lines 114 to substations 116 having transformers. A local distribution system of smaller, transmission lines 118 (which may be lower voltage than transmission lines 114) and substations 120 and 122 carry power to the customer premises 124. In the example of FIG. 1, the power generation facility 110 can generate electric power which is passed to a point on the grid (e.g., substation 116, etc.) and carried to the customer premise 124.

A variety of facilities can generate electric power including both power plants and renewable energy sources. For example, power generation facility 110 can include power plants that burn coal, oil, or natural gas. As another example, power generation facility 110 can include nuclear power plants, renewable sources of energy such as hydroelectric dams, wind turbines, solar panels, and the like. The location of these power generation facilities, and their distance from end users, can vary widely.

The electricity that is generated by the power generation facilities may be stepped up or stepped down by transformers (e.g., transformer 112) which may be located at power plant substations adjacent to (and connected via power lines to) the power plant. For example, a transformer may be a step-up transformer that will "step up" the voltage of the electricity. When power travels through power lines (e.g., metallic wires that conduct electricity), some of that power is wasted in the form of heat. The power loss is proportional to the amount of current being carried. Power companies keep the current low and compensate by stepping up the voltage. After the voltage is stepped up, the electricity is typically carried over long distances by high voltage power transmission lines, typically supported and elevated by transmission towers (e.g., transmission lines 114 and 118) that can be of various dimensions, materials, and heights.

The voltage may be gradually reduced by step-down transformers as the electricity approaches customer premises. Transmission substations contain step-down transformers that reduce the voltage of the electricity. The electricity can then be distributed on lower-voltage power lines. A typical transmission substation can serve tens of thousands of customers. The electricity leaving transmission substations can travel through power lines to distribution substations. Distribution substations contain step-down transformers that further reduce the voltage of electricity and distribute the power with distribution, or branch, lines running through urban and rural areas. Distribution lines carry lower voltage power to clusters of homes and businesses, and are typically supported by wooden poles. Of note, power lines can also be buried under the ground. Of note, substations can contain a variety of other equipment, including switches, breakers, regulators, batteries, etc.

The voltage from a branch line can further be reduced by transformers that are mounted on poles that connect customer premises through a service drop power line. Customer premises (e.g., customer premise 124, etc.) can be of any type and variety. Customer premises can be a residential customer premises, such as residential houses. Customer premises can be an industrial customer premises, such as factories. Customer premises can be commercial customer premises, such as an office building. If a particular customer premises has a heavier load (e.g., has a higher demand for power), then a larger transformer, instead of a pole transformer, might service that particular customer premises.

FIG. 1B depicts an illustration of a power grid system 130 (e.g., an electrical grid) comprising multitudes of nodes 132. In this example, a node 132 may represent a power generation facility, transmission substation, a distribution substation, and the like, and is intended to convey that such facilities and substations can be interconnected. In the examples herein, a node may be referred to as a "power system node." The power grid system 130 can follow a structural topology, influenced by factors such as budget, system reliability, load demand (demand for power), land, and geology. The structure of the medium to high voltage transmission grid typically tends to follow a classic meshed topology, whereas the relatively lower voltage distribution grid feeding power to many cities and towns, for example many of those in North America, tends to follow a classic radial topology. This is a tree-shape network wherein power from larger voltage lines and substations radiates out into progressively lower voltage lines and substations until the customer premises are reached.

A substation receives its power from a power generation facility, and the power may be stepped down with a transformer and sent through lines that spread out in all directions across the countryside. These feeders carry three-phase power and tend to follow major streets near the substation. As the distance from the substation grows, the fanout continues as smaller laterals spread out to cover areas missed by the feeders. This tree-like structure grows outward from the substation, but a single power failure can render inoperable entire branches of the tree. For reliability reasons, there are often unused backup connections from one substation to a nearby substation. This backup connection can be enabled in case of an emergency, such that a part of a substation's service area can be fed by another substation in case of any power failure events. Redundancy allows line failures to occur and power to be rerouted while workmen restore to service damaged or deactivated components. Neighboring power utilities also typically link their grids, thereby assisting one another to maintain a balance between power generation supply and loads (e.g., customer demand). Other topologies can be mesh topologies, looped systems (mostly found in Europe) and ring networks.

The result can be an interconnected power grid system 130 that can form complex networks of power plants and transformers connected by hundreds of thousands of miles of high-voltage transmission lines. While these interconnections can be useful in situations, the danger or risk can comprise the possibility that a shutdown in one sector could rapidly spread to other sectors, leading to massive power failures in a wide area.

In the example of FIG. 1B, disposed within the power grid system 130 are measurement devices. Throughout the power grid 130, a variety of sensors, monitoring devices and measurement devices (collectively referred to herein as "measurement devices") can be located at one or more nodes (e.g., nodes 132), in between nodes on lines, and the like, and can be used to provide monitoring data related to power flow measurements, or monitor the condition of one or more aspects of a power grid system. The measurement devices may be deployed within, or adjacent to, power transmission components (e.g., generating units, transformers, circuit breakers), including at substations. In some examples, the measurement devices can also be deployed along distribution lines.

The measurement devices may include sensors that measure a range of parameters such as magnitude and phase angle of voltage, current, harmonic distortion, real and reactive power, power factor, and fault current. Examples of some sensors include, but are not limited to, voltage and current sensors, PMUs, transformer-Metal Insulated Semi-conducting (MIS) gas in oil sensors, circuit breaker sulfur hexafluoride density sensors, conductor temperature and current sensors that record overhead transmission conductor temperatures and current magnitudes, overhead insulator leakage current sensors, Transmission Line Surge Arrester (TLSA) sensors, and the like.

In the example of FIG. 1B, the power grid system 130 may include the measurement devices located in various parts (e.g., such as nodes) throughout the grid. The measurement devices can be coupled via a network of transmission lines, as well as through wireless and wired communications mediums (e.g., cellular, ethernet, etc.). For example, a measurement device can be coupled via a transmission line from a network of transmission lines associated with the nodes. Furthermore, a subset of the measurement devices can be associated with a sector of the power grid system 130.

According to the example embodiments described herein, the system may determine that the power grid 130 is to be outed in response to an emergency situation that includes severe weather such as a wildfire, a hurricane, a storm, and the like. Rather than out the entire grid 130 at once, the example embodiments can identify a sequence among various smaller sub-sections 141, 142, 143, 144, and 145 that can reduce unnecessary downtime and ensure grid stability based on geospatial data and trajectory/timing data of the severe weather.

In the example embodiments, an outage plan 140 can be generated that includes a sequence in which the sub-sub-sections 141, 142, 143, 144, and 145 should be outed, and the timing information at which such outages should occur. For example, the sequence may include powering down sub-section 141 at 4:14 pm, powering down sub-section 142 at 4:17 pm, powering down sub-section 143 at 4:28 pm, powering down sub-section 144 at 4:29 pm, and powering down sub-section 145 at 4:32 pm.

In the example embodiments, an outage and restoration planning software system may be implemented together/within an Energy management system (EMS) of a power grid or an additional system that is in communication with the EMS. The system can generate an outage plan and/or restoration plan based on the geolocation and the timing of forecasted weather (such as severe weather) with respect to the geolocation of transmission assets such as transmission lines, transformers, and the like. By incorporating attributes of forecasted weather into the planning, the system can prevent over shedding of power (e.g., unnecessary power shut off, etc.) and at the same time prevent blackouts or brownouts from instability.

It is well known that difference in timing and sequence of steps in an outage plan or a restoration plans can lead to very different intermediate states of the power grid (e.g., base case and contingency violations, islands, etc.). Thus, for all practical purposes of grid operations, knowing the proper timing and sequence of large-scale outage and restoration operations during the planning stage and then following the planned timing and sequence during the execution stage is vital in determining the security and stability of the grid under such challenging situations. The different ranking algorithms in the example embodiments may work together in a coordinated manner to consider non-power system factors and power system factors in a holistic approach to outage and restoration planning.

Attributes such as forecasted weather conditions, critical loads, crew inspection reports, voltage priorities, and the like, can be considered by the system described herein to generate an overall ranking of the transmission assets (i.e., an order in which the transmission assets should be shut down or restored) and also a time at which each asset should be powered down. The result is a sequence of instructions that can be displayed via a user interface and/or input into an EMS system where the EMS system is able to automatically shut down the transmission assets on the power grid based on the rankings/priorities generated by the system described herein.

Emergency operations planning typically needs to be performed in a very time-constrained environment and at the same time demands high accuracy. As a result, a human usually performs the operations planning manually. In the example embodiments, the system can automatically generate an outage plan or a restoration plan faster and more accurately than in conventional manual process.

FIG. 2A illustrates a process 200 of determining an outage sequence for transmission assets based on severe weather in accordance with example embodiments. In this example, multiple factors such as non-power system factors (e.g., geospatial aspects of weather, etc.) and power systems factors (e.g., critical loads, line kVs, etc.) can be considered together and used to generate a comprehensive ordering or sequence of transmission assets (such as transmission lines, etc.) that are to be outed or restored and timing of such events.

Referring to FIG. 2A, in 202, the system may select a set of transmission assets for outage. The transmission assets may be selected by the software in an automated manner. For example, the system may select a set of transmission lines to be outed based on the forecasted weather conditions and the geospatial locations of the transmission lines. The system may detect which lines should be outed during an overall strategy planning. An auto-selection algorithm may be used which receives inputs such as an Outage Time Window, $OW=[t_s, t_e]$, severe weather criteria (e.g., forecasted geolocations and times of severe weather, etc.) For example, the system may retrieve the weather data for all time points in the outage time window for all weather regions (such as locations along the transmission line or weather zones etc.) For each time point in the outage time window, the system may identify weather regions falling under severe weather conditions. As another example, the system may select the set of transmission assets for outage based on an input received via a user interface.

For each weather region falling under severe weather conditions, the system may identify lines passing through the weather region. These set of lines are identified as list of lines under severe weather conditions, retrieve vulnerability information about each of these lines (vulnerability can be determined using past historical data about severe weather events, asset maintenance etc.) From the above data, the system can identify the set of lines that are vulnerable and fall under severe weather conditions. If necessary, user feedback input through a user interface (such as an EMS interface, etc.) may manually add or remove lines from the above step. The final set of lines thus formed is used for outage strategy creation.

In 204, the system may request (e.g., send SMS messages, emails, mobile application requests, etc.) to inspection crews with feedback on the proposed transmission lines. For example, the system may send the selected list of transmission lines (for outage strategy creation) for crew inspection. The crews may provide different risk scores and inspection images to the system. Various criteria that help us assess the risk of a catastrophic event and its probable impact are evaluated by the crew and risk scores are given to the criteria. These criteria include but are not limited to community proximity risk, vegetation proximity risk, dry fuel conditions risk, poor line condition risk, poor tower condition risk, and the like. The risk scores may be quantified in such a way to help understand a level of threat to each of the transmission lines. For example, the conditions may be reported as "high" risk, "low" risk, "no" risk, and the like. The images from the inspection may be shared by the crew which can be used later for audit purposes.

In 206, the system may initialize criticality weights for a line outage strategy algorithm. The criticality weights may give weights to various factors to be considered for ranking the transmission assets such as weather priority, crew reports priority, kV priority, load criticality priority, and the like. The system may assign each of these attributes a weight or an order of importance. For example, weather priority may be most heavily weighted while load criticality can be least heavily weighted, or the like.

The system may also assign different relative weights for example between 0-10 to different Load Criticality Factors used to determine the Load Criticality Index. For example, different types of critical loads such as airports, heliports, hospitals, fire stations, police stations, and the like, are identified and considered in the outage strategy creation process. The system may assign weights relative weights for example between 0-10 to different attributes of critical loads used in the load criticality factors. Different features of a critical loads provide different levels of importance when determining the outage sequence.

Figure 4A:
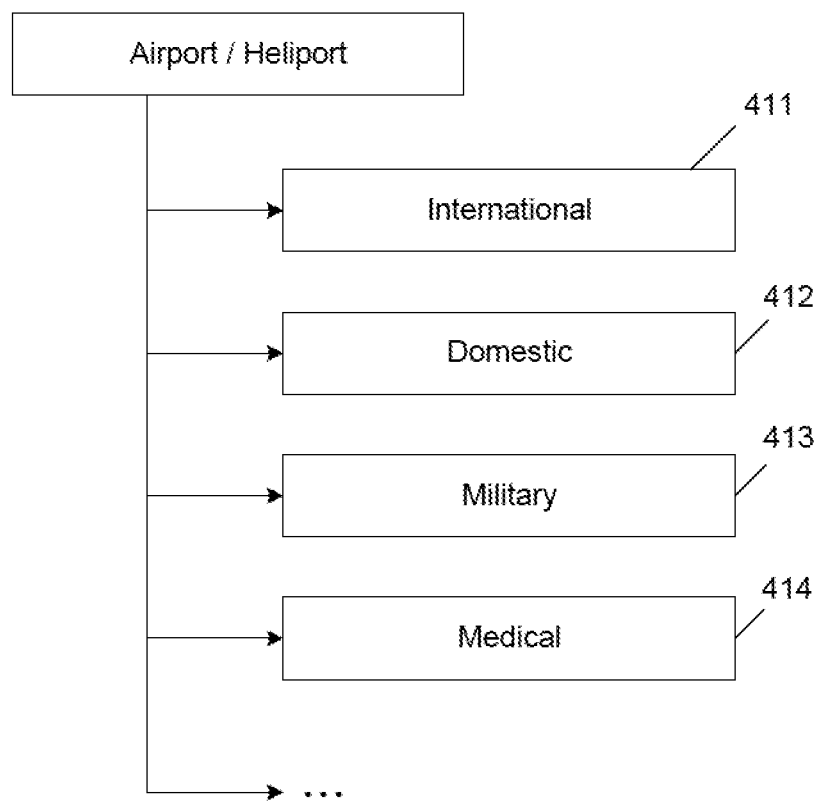
FIGS. 4A-4B are diagrams illustrating examples of load priorities in accordance with example embodiments.
Figure 4B:
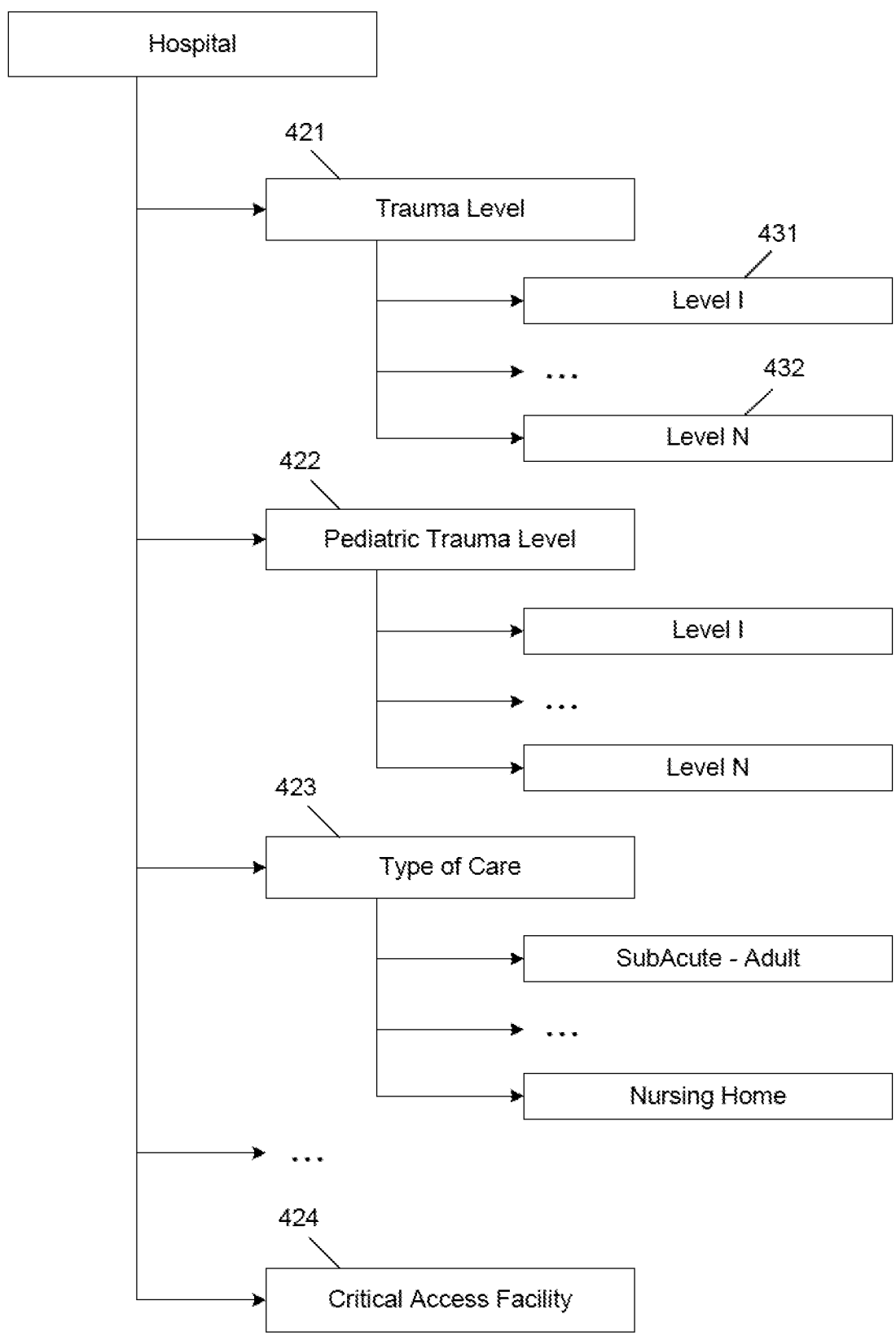

Examples of the priority of different types of loads is shown in FIGS. 4A and 4B. In particular, FIG. 4A illustrates a non-limiting example of load priorities among different type of airports/heliports 411, 412, 413, 414, etc. and FIG. 4B illustrates a non-limiting example of load priorities among different types of hospitals 421, 422, 423, 424, etc., in accordance with example embodiments. Referring to FIG. 4A, a load priority 400 is developed for different types 411-414 of critical airport/heliport locations on the grid. Here, the load priority among the different types 411-414 of airports/heliports assigns a highest priority to international airports 411, a next highest priority to domestic airports 412, a third highest priority to military-based airports/heliports 413, a fourth highest priority to medical-based heliports 414, etc. The order of priority may be different and may include different types of loads than those shown.

In the equation below, $W^A$ is the airport and heliport importance weights matrix for x different attributes of interest for a facility as discussed above.

$$W_{xX1}^A = (w_i) = \begin{bmatrix} w_i \\ \vdots \\ w_x \end{bmatrix}$$

Here, n is the number of facilities in the area of interest. Each facility has x attributes such as the priority attributes described above, and a sparse feature matrix A is built such that represents the quantitative representation of an attribute in a given facility.

$$A_{nXx} = (a_{ij}) = \begin{bmatrix} a_{11} a_{12} & \ldots & a_{1x} \\ & \vdots & \\ a_{n1} a_{n2} & \ldots & a_{nx} \end{bmatrix}$$

The facility index of each airport/heliport facility in the threat zone may be calculated as follows:

$$FI_{nX1}{}^A = (f_i) = A_{nXx} W_{xX1}$$

The airport index of each transmission line may be calculated as follows where $AI_i$ is the airport index of the ith transmission line:

$$AI = \sum_{i=0}^{n} f_i$$

The airport priority matrix of all transmission lines may be represented as follows:

$$AP_{mX1} = (ap_i) = \begin{bmatrix} AI_1 \\ AI_2 \\ \vdots \\ AI_m \end{bmatrix}$$

The airport priority matrix may be normalized as follows:

$$API_{mX1} = \frac{AP - \min ap_i}{\max ap_i - \min ap_i}$$

Meanwhile, referring to FIG. 4B, a load priority 420 is developed for different types of hospitals 421-424. In some cases, each type of hospital may be further broken down into sub-levels based on trauma level or other attributes. Here, the load priority among the different types of hospitals 420 assigns a highest priority to trauma hospitals 421, a next highest priority to pediatric trauma hospitals 422, a third highest priority to type of care hospitals 423, a fourth highest priority to critical access facilities 424, etc. The order of priority may be different and may include different types of loads than those shown. In the mathematical formulation below, $W^H$ is the hospital importance weights matrix for x different attributes of interest for a facility as discussed above. Further, n refers to the number of facilities in the area of interest. Each facility has x attributes of interest such as the ones described above, and a sparse feature matrix H is built such that is represents the quantitative representation of an attribute in a given facility. The mathematical formulation is an example for determining a hospital priority index.

Below is an example of a hospital importance weight matrix for x different attributes.

$$W_{xX1}^H = (w_i) = \begin{bmatrix} w_1 \\ w_2 \\ \vdots \\ w_m \end{bmatrix}$$

In this example, a sparse feature matrix H is built such that it represents a quantitative representation of an attribute in a given facility.

$$H_{xXx} = (h_{ij}) = \begin{bmatrix} c_1 & s_1 & a_1 \\ c_2 & s_2 & a_2 \\ \vdots & \vdots & \vdots \\ c_m & s_m & a_m \end{bmatrix}$$

The facility index of each hospital facility in the threat zone may be calculated as follows:

$$FI_{xX1}{}^H = (h_{ij}) = X_{nXx} W_{xX1}{}^H$$

The hospital index of each transmission line may be calculated as follows where $HI_i$ is the airport index of the ith transmission line:

$$HI = \sum_{i=0}^{n} f_i$$

Further, the hospital priority matrix of all transmission lines with segments in severe weather conditions can be represented as follows:

$$HP_{mX1} = (hp_i) = \begin{bmatrix} HI_1 \\ HI_2 \\ \vdots \\ HI_m \end{bmatrix}$$

The hospital priority matrix may be normalized as follows:

$$HPI_{mX1} = \frac{HP - \min hp_i}{\max hp_i - \min hp_i}$$

Referring again to FIG. 2A, in 208, the system may identify which transmission assets are going to be affected by severe weather based on geospatial information of the severe weather as well as the geospatial location of the transmission assets which may be transposed on each other by the system to identify areas of overlap. When the areas are identified, the system may then use a combination of factors, as further described herein, to determine a sequence/order in which the transmission assets should be outaged and/or restored and the times at which such actions should be taken.

Figure 2B:
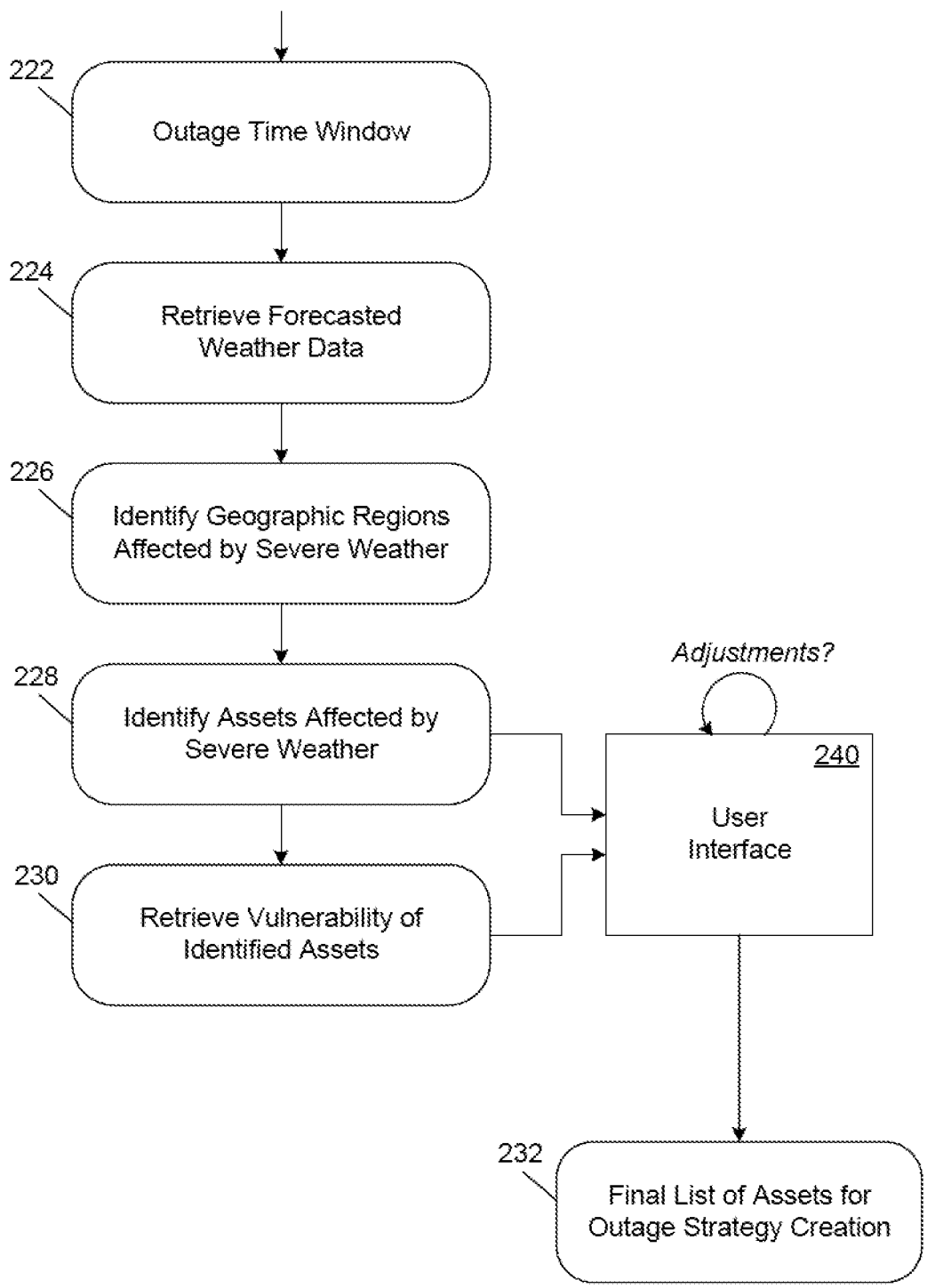
FIG. 2B is a diagram illustrating a process of determining a subset of transmission assets that will be affected by severe weather in accordance with example embodiments.

In 210, the system may determine a weather priority of each transmission asset and label it with a value, referred to as an index. FIG. 2B illustrates a process 220 of determining a weather priority for transmission assets. In this example, in 222, an outage time window may be provided from a weather service or other system. Also, in 224, weather forecast data may be retrieved from a resource such as a secured online weather-based website, or the like. In 226, geographic regions of severe weather may be identified, and from this, in 228, each transmission line with segments under severe weather conditions may be identified and used to determine the earliest time the severe weather condition will occur at the transmission line which can be used to identify an estimated start time of outage for the transmission asset to avoid the severe weather. The difference in time between the outage start time and the earliest severe weather condition time, may be used by the system in 230 to determine the order in which the transmission assets need to be taken out of service (if they are vulnerable).

To give higher weight to lines with early outage conditions, the weather priority index can be generated by subtracting the time difference from each transmission asset from a maximum time difference among all transmission assets. In some embodiments, the weather priority index may be normalized using Min-Max scaling. Also, the system may estimate a wave number (group number) for a transmission line by grouping and sorting the lines in decreasing order of the weather priority index. The list may be output in 232 to be considered with the other priority factors in FIG. 2A. Also, a user interface 240 may be provided that may display the list of transmission assets and the order in which they are to be powered down/restored, as well as the timing information of such events. Here, a user may use the user interface to manipulate the order or feedback additional information or support for the system to consider and modify the list in some way when generating the output in 232.

The following description provides an example of the mathematical formulation of the weather priority index. In the equation below, T is the times during which a transmission line was under severe weather conditions during the outage time window $OW=[t_s, t_e]$ $$T=(t_i)=[t_1,t_2,t_2 \ldots, t_n], t_s \leq t_1, t_n \leq t_e$$

The earliest outage time for a transmission line is $et=\min t_i$. In this example, m is the number of transmission lines for an outage strategy creation. Here, the earliest outage time for all transmission lines can be represented as:

$$RT = \begin{bmatrix} et_1 \\ et_2 \\ \vdots \\ et_m \end{bmatrix}$$

The weather priority may be calculated using the equation below.

$$DT = \begin{bmatrix} et_1 \\ et_2 \\ \vdots \\ et_m \end{bmatrix} - t_s = \begin{bmatrix} dt_1 \\ dt_2 \\ \vdots \\ dt_m \end{bmatrix}$$

$$WP = \max dt_i \begin{bmatrix} dt_1 \\ dt_2 \\ \vdots \\ dt_m \end{bmatrix} - t_s = \begin{bmatrix} w_1 \\ w_2 \\ \vdots \\ w_m \end{bmatrix}$$

The Weather Priority Index may be normalized as follows:

$$WPI_{mX1} = \frac{WP - \min w_i}{\max w_i - \min w_i}$$

In 212, the system may retrieve different risk scores and supporting evidence the inspection crew provides during the inspection done in their assigned area of responsibility. The different criteria for evaluation include, but are not limited to community proximity risk, vegetation proximity risk, dry fuel conditions, risk, poor line condition risk, poor tower condition risk, and the like. Each inspection crew may calculate a crew risk assessment score, by taking the maximum risk condition that could lead to catastrophic outcomes like fire. The inputs from the crews may be received via the user interface 240 or it may be received in some other way such as SMS messages, emails, telephone calls, etc.

Furthermore, for each transmission line, the system may calculate an overall crew risk assessment, by estimating the maximum threat in all regions along the length of the line where the inspection was done. A supervisor can evaluate the overall crew risk assessment using the evidence (historical and current) and provide an assessment called supervisor risk assessment. If a transmission asset has not been evaluated for crew risk assessment or the supervisor risk assessment, a conservative approach is taken where the line is assumed to be in a high-risk zone, this is estimated as the auto risk assessment. Furthermore, based on the crew risk assessment and the supervisor risk assessment, the system can estimate a maximum level of risk and an overall crew priority index for each transmission asset. In some embodiments, the crew priority index may be normalized using Min-Max scaling, or the like.

In the example below, there is provided a mathematical formulation for generating an auto risk assessment matrix. In this formulation, m is the number of transmission lines selected for outage strategy creation, C is the crew risk assessment matrix, S is the supervisor risk assessment matrix, and A is the auto risk Assessment matrix.

$$C_{mX1} = (c_i) = \begin{bmatrix} c_1 \\ c_2 \\ \vdots \\ c_m \end{bmatrix}$$

$$S_{mX1} = (s_i) = \begin{bmatrix} s_1 \\ s_2 \\ \vdots \\ s_m \end{bmatrix}$$

$$A_{mX1} = (a_i) = \begin{bmatrix} a_1 \\ a_2 \\ \vdots \\ a_m \end{bmatrix}$$

$$R_{mX3} = (r_{ij}) = [CSA] = \begin{bmatrix} c_1 & s_1 & a_1 \\ c_2 & s_2 & a_2 \\ \vdots & \vdots & \vdots \\ c_m & s_m & a_m \end{bmatrix}$$

Furthermore, the crew priority index may be calculated as follows:

$$CP_{mX1}=(cp_i)=\max r_{ij}, i=1,2,3$$

The index may be normalized as follows:

$$CPI_{mX1} = \frac{CP - \min cp_i}{\max cp_i - \min cp_i}$$

Different power system factors can be used to contribute to the algorithm of the transmission asset outage strategy sequence. For example, in 214, a kilovolt (kV) level of a transmission asset (e.g., a line, etc.) can be taken into consideration as a factor. For each transmission line with segments under severe weather conditions, the system may retrieve the kV level information. A kV priority index may be calculated depending on the preference to outage low kV transmission lines or high kV transmission lines first. Preference to outage low kV transmission lines first may give higher weightage to low kV transmission lines, etc. Below is an example mathematical formulation of the kV priority index. In the formula below, m is the number of transmission lines for outage strategy creation, and K is the kV level matrix of the transmission lines.

$$K_{mX1} = (k_i) = \begin{bmatrix} k_1 \\ k_2 \\ \vdots \\ k_m \end{bmatrix}$$

If lower kV level transmission lines need to be given higher priority in the outage sequence, then the kV priority index may be calculated as follows:

$$K_{mX1} = (\max k_i) - \begin{bmatrix} k1 \\ k2 \\ \vdots \\ k_m \end{bmatrix}$$

If higher kV level transmission lines need to be given higher priority in the outage sequence, then the kV priority index may be calculated as follows:

$$K_{mX1} = (k_i) = \begin{bmatrix} k_1 \\ k_2 \\ \vdots \\ k_m \end{bmatrix}$$

Also, the kV priority index may be normalized as follows:

$$KPI_{mX1} = \frac{KP - \min k_i}{\max k_i - \min k_i}$$

In 216, the system may determine a load priority index for each transmission asset under severe weather conditions and build a threat zone (planar area) of an x mile radius (e.g., x=2.5 miles, 4 miles, 6 miles, etc.) around the transmission line segments under severe weather conditions. For example, airports, heliports, hospitals, emergency services (police, fire, ambulance, etc.) may be identified and assigned priority values based on criticality of the loads.

For example, the system may determine all the airport, heliport, hospitals, business, etc., of the facilities falling in the threat zone using proximity analysis. For each facility in the threat zone, calculate the load priority index of each using importance weights. For each transmission line with segments under severe weather conditions, calculate a combination of airport priority, hospital priority, business priority, etc. by aggregating the sum of facility indices of all the facilities in the threat zones of the transmission line. Furthermore, the system may normalize the priority indices of a transmission line, using a min-max scaling technique.

The system may determine other priorities such as business priorities of businesses that are located within the geographical area of the forecasted severe weather. The system may retrieve the number of business information for all businesses in the area of the utility. For each transmission line with segments under forecasted severe weather conditions, the system can determine the ZCTAs falling in the threat zones using proximityanalysis. For each ZCTAs falling in the threat zone, the system may estimate the area of each ZCTA within the threat zone, estimate the overall percentage of area of each ZCTA within the threat zone, estimate the business index by the number of businesses in the threat zone by using the percentage calculated above as a multiplication factor for the total number of businesses, and calculate the business priority index by aggregating the sum of all business indices in all the threat zones of the transmission line. The system may normalize the business priority index, using Min-Max scaling technique or the like.

As another example, the system may calculate a population priority matrix. For example, the system may retrieve the population information for all the ZCTAs in the area of the utility. For each transmission line with segments under severe weather conditions, the system may determine the ZCTAs falling in the threat zones using proximityanalysis. For each ZCTAs falling in the threat zone, the system may estimate the area of each ZCTA within the threat zone, the system may estimate the overall percentage of area of each ZCTA within the threat zone, and estimate the population index by the population in the threat zone by using the percentage calculated above as a multiplication factor for the total population in the ZCTA. The system may calculate the population priority index by aggregating the sum of all population indices in all the treat zones of the transmission line. Furthermore, the system may normalize the population priority index using Min-Max scaling.

Based on the combination of any of the indices generated at steps 210, 212, 214, and 216, and any other additional indices that may or may not be specifically mentioned above, the system can generate an overall priority for the transmission assets in 218 by weighting the different indices according to the criticality weights assigned in step 204 and determining a total aggregate priority weight for each transmission asset. For example, the system may use a clustering approach to identify the final subsets of transmission assets and the order in which the subsets of transmission assets should be powered down and/or restored. The overall priority output in 218 may include a sequence or transmission assets to be powered down as well as time points at which such transmission assets are to be powered down. This information may then be executed by the system which send signals to the transmission assets to power down based on the instructions output in 218.

As shown in FIG. 2C, a process 250 of clustering transmission assets based on different priority factors is shown. Here, the first factor that is considered is weather (clusters 251), followed by crew reports (clusters 252), kV attributes (clusters 253), critical loads (clusters 254), and other factors (clusters 255). Each layer of clustering may further refine the list of transmission assets in each subset. For each priority index generated in 210, 212, 214, 216, etc., the system may recursively cluster the transmission lines based on a given priority index (e.g., weather clusters to start with), and sort the clusters in descending order of priority index. For each subset/sub cluster formed, the system may again cluster and sort based on the next priority index based on its order of importance which may be predefined. The result is a final order of the transmission assets with the clusters forms the overall priority of the list of transmission assets for a severe weather-based outage strategy.

Figure 3A:
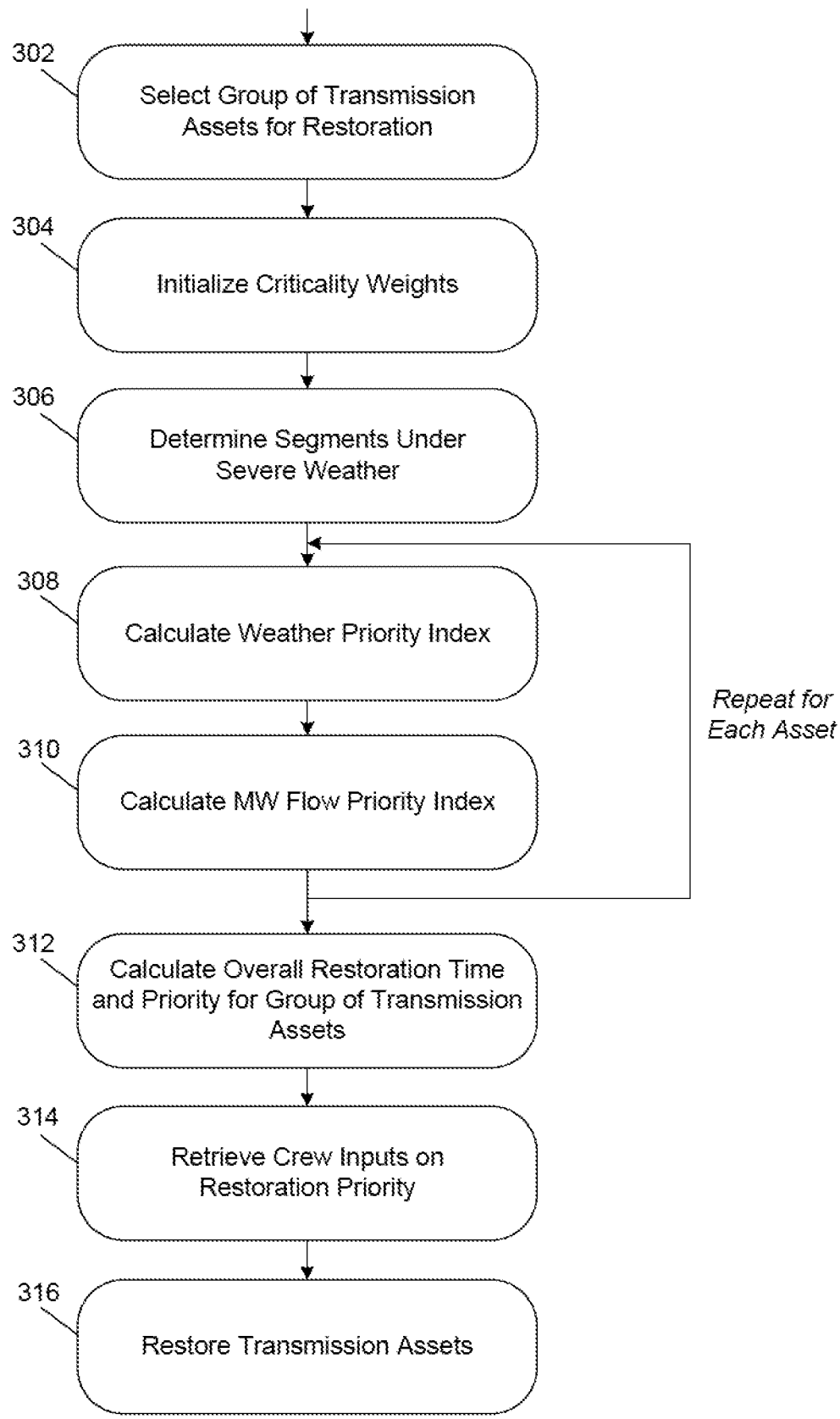
FIG. 3A is a diagram illustrating a process of determining a restoration time and sequence for transmission assets based on severe weather in accordance with example embodiments.
Figure 3B:
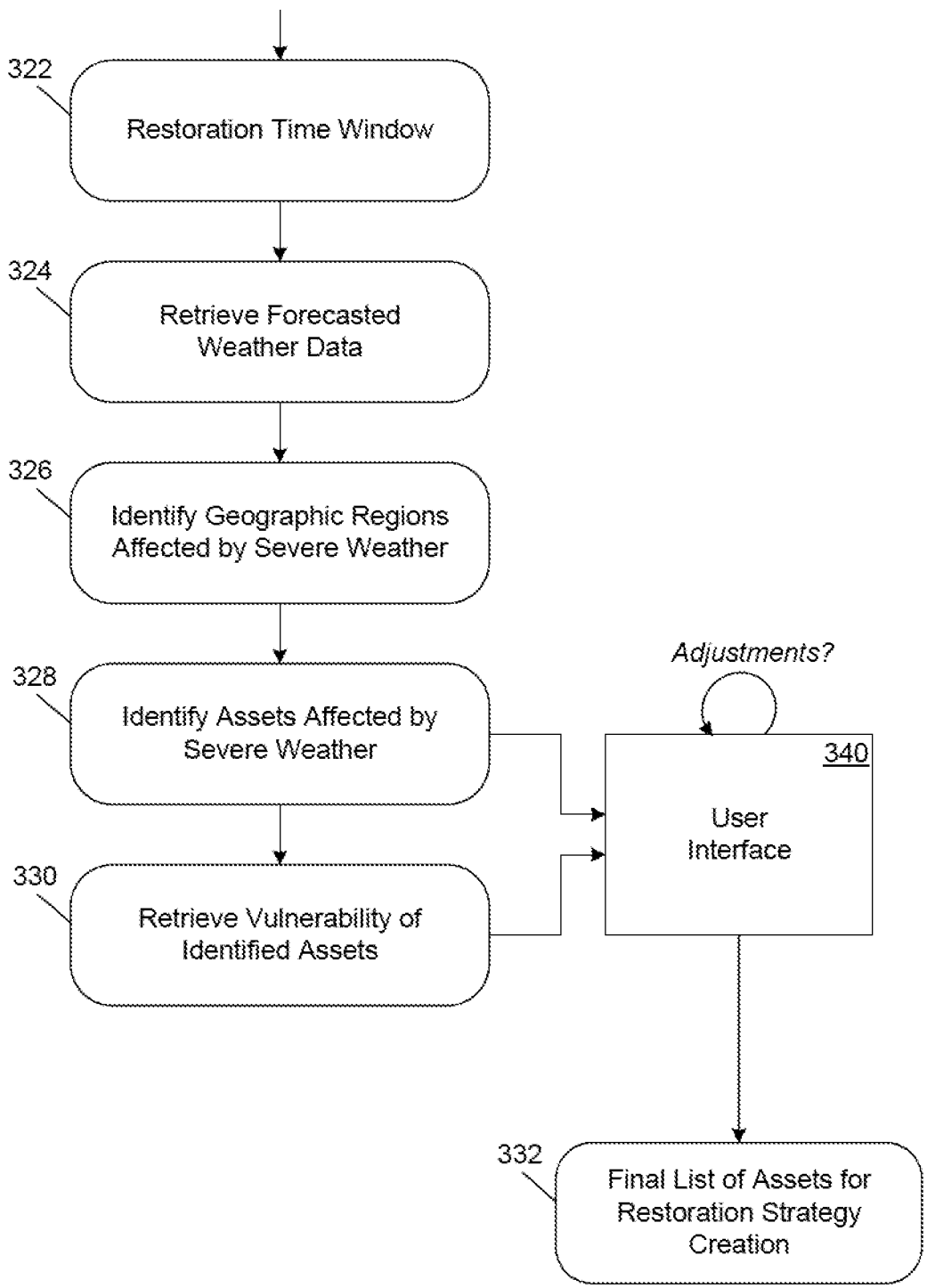
FIG. 3B is a diagram illustrating a process of determining a subset of transmission assets that will be affected by severe weather in accordance with example embodiments.
Figure 3C:
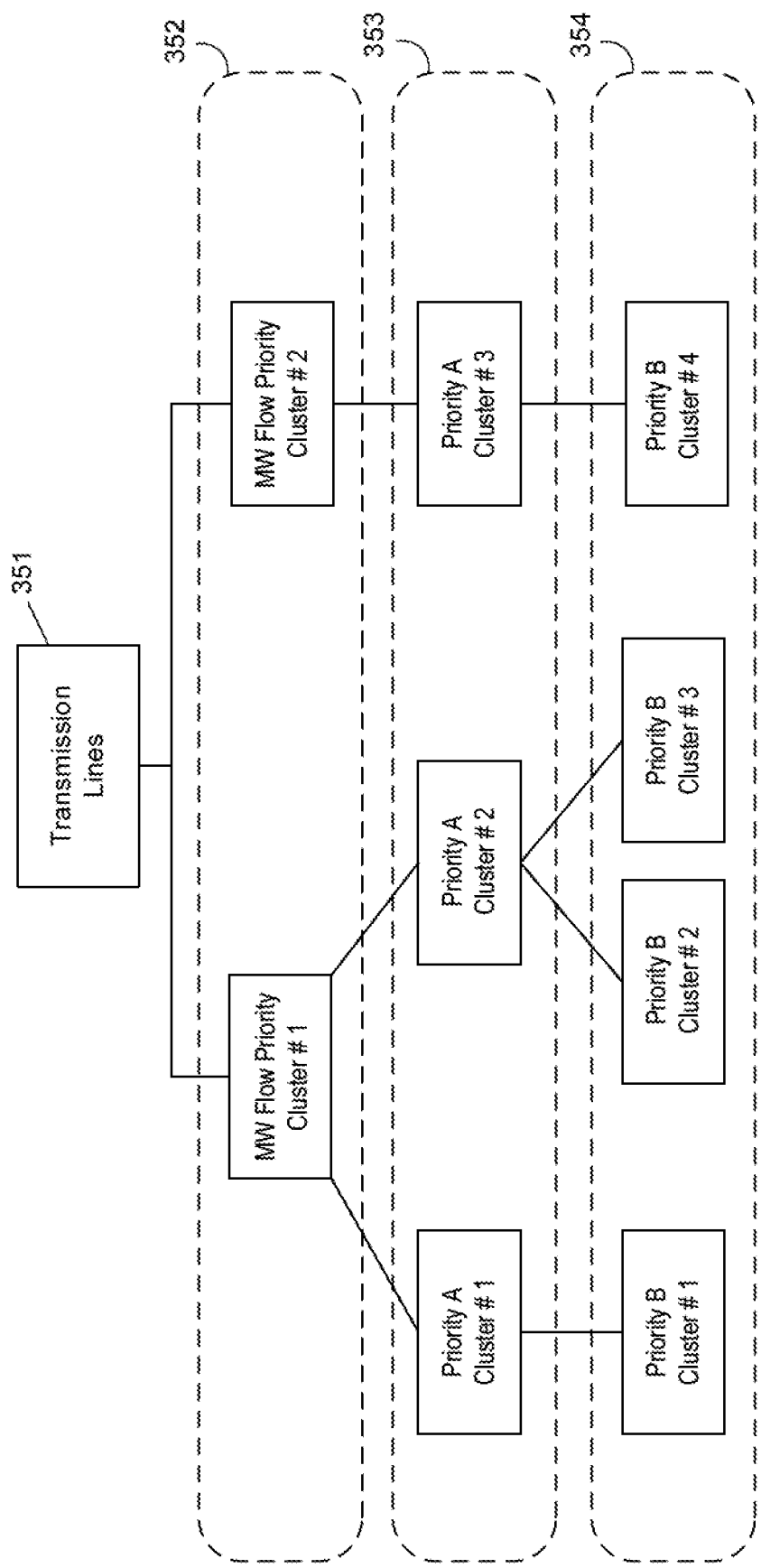
FIG. 3C is a diagram illustrating a process of clustering to identify sections within the grid to be restored in accordance with example embodiments.

It should also be appreciated that the clustering process described in FIG. 2C may be performed for a restoration plan as well as further described in the example of FIG. 3C. Furthermore, it should be appreciated that the priority attributes (e.g., weather, load crew, crew reports, KV values, etc.) may have different priorities amongst themselves than is shown in FIG. 2C. Also, different priority attributes may be considered and/or one or more of the priority attributes shown in FIG. 2C may not be considered.

FIG. 3A illustrates a process 300 of determining a restoration sequence for transmission assets based on severe weather in accordance with example embodiments. The auto-selection algorithm for asset restoration may be performed based on geospatial locations of forecasted weather events as well as expected times of such forecasted weather events. In addition, other factors such as load criticality, flow priority, and the like, may be used to identify an optimal transmission asset restoration plan.

In the example embodiments, a group of transmission assets to be restored may be selected by the system, for example, based on a software program or a user input via a user interface. Here, the group may correspond to a group of transmission assets that as already had an outage plan generated. The system may initialize criticality weights and detect which transmission assets (e.g., line segments, etc.) which are under forecasted severe weather. To do this, the system may receive an input of a restoration time window, severe weather data forecasted for the point in time corresponding to the restoration, and the like. For each time point in the restoration time window, the system may identify weather regions falling under severe weather conditions and identify lines that geographically pass-through the severe weather region by transposing the forecasted weather events on the geographical locations of the transmission assets (e.g., via a graphical overlay on a user interface, etc.). These set of lines are identified as list of lines under severe weather conditions, retrieve Vulnerability information about each of these lines (vulnerability can be determined using past historical data about severe weather events, asset maintenance etc.)

Referring to FIG. 3A, in 302, a group of transmission assets are selected for restoration, and in 304 criticality weights are initialized. Here the system may receive, as inputs, a restoration time window, RW=[$t_s$, $t_e$], severe weather criteria from a weather service and the like. An example of criticality weights includes a weather index=1, MW flow priority=2, crew inspections=3, or the like. In 306, the system may retrieve weather data for all time points in the restoration time window for multiple weather regions (such as locations along the transmission line or weather zones etc.) For each time point in the restoration time window, the system may identify weather regions falling under severe weather conditions and identify transmission assets/lines passing through the weather region. These sets of lines are identified as a list of lines under severe weather conditions. The system may also retrieve vulnerability information about each of these lines (vulnerability can be determined using past historical data about severe weather events, asset maintenance etc.) From the above data, the system can identify the set of lines that are vulnerable and fall under severe weather conditions. If necessary, a user interface can be used to manually add or remove lines from the list and the final set of lines thus formed is used for restoration strategy creation.

The system may also calculate a weather priority index as previously described herein with respect to FIG. 2A. In 308, the system may determine the earliest time that the forecasted severe weather condition for each transmission line will be no more (i.e., will have left the area), and for each transmission line, determine the earliest time the severe weather condition occurs no more, as the estimated start time of restoration for the transmission line, or shortly thereafter to add a buffer. The difference in time between the restoration start time and the estimated start time for restoration, helps the system determine the order in which the transmission lines need to be put into service (if they are fit to be restored). To give higher weightage to lines with early favorable weather conditions, the system may calculate the weather priority index by subtracting the time difference of each transmission asset/line from the maximum time difference among all the lines. The system may also normalize the weather priority index using a min-max scaling technique. In addition, the system may estimate the wave number (group number) for a transmission line by grouping and sorting the lines in decreasing order of Weather Priority Index.

In 310, the system may calculate the MW flow priority index. Different power system factors can be used to contribute in the algorithm of transmission line restoration strategy sequence. For example, MW flow of a line can be taken as a factor. For each transmission line, retrieve the MW flow information using the estimated start time of restoration from above. The MW Flow Priority Index may be calculated using the MW flow through the transmission lines. Generally, preference may be given to restore high MW flow transmission lines first. Below is a mathematical formulation of the MW flow priority index being generated. In this example, m is the number of transmission lines for restoration, MW is the MW flow matrix of these transmission lines.

$$M_{mX1} = (mw_i) = \begin{bmatrix} mw_1 \\ mw_2 \\ \vdots \\ mw_m \end{bmatrix}$$

If higher MW flow transmission lines need to be given higher priority in the restoration sequence, the MW flow priority index may be calculated as below:

$$M_{mX1} = \begin{bmatrix} mw_1 \\ mw_2 \\ \vdots \\ mw_m \end{bmatrix}$$

The MW flow priority index may be normalized as below:

$$MWPI_{mX1} = \frac{MW - \min mw_i}{\max mw_i - \min mw_i}$$

In 312, an overall priority of each transmission asset may be determined. For each priority index previously generated, the system may recursively cluster the transmission lines based on the priority index (e.g., starting with weather priority index, etc.), sort the clusters in descending order of priority index, and for each sub cluster formed in the above step, cluster and sort based on the next priority index and its order of importance. The final order of the transmission assets to be restored within the clusters forms the overall priority of the list of transmission assets for severe weather-based restoration strategy.

An example of the clustering based on priority is shown in FIG. 3C. In particular, FIG. 3C illustrates an example of a process 350 of clustering to identify sections within the grid to be restored in accordance with example embodiments. As shown in FIG. 3C, a set of transmission lines 351 may be divided into a first set of clusters 352 based on a first priority attribute. In this example, the first priority attribute is MW flow priority, but it could be a different attribute depending on implementation. The first set of clusters 352 are then further divided into a second set of clusters 353 based on a second priority attribute. The second set of clusters 353 may be further divided into a third set of clusters 354 based on another priority attribute, etc.

Furthermore, crew inputs can be received based on the order in 314, and the system may use the crew inputs to adjust the final order that is output in 316. The crews may receive the ordered list of transmission lines for restoration strategy creation output in 312, and determine various risk scores based on conditions on the ground such as vegetation, line conditions (e.g., poor versus good, etc.), tower conditions, etc. This feedback may be considered by an operator or the like, when making the final choices for the restoration plan.

FIG. 3B illustrates a process 320 of determining a subset of transmission assets that will be affected by severe weather in accordance with example embodiments. As an example, the process 320 may be performed during steps 306 and/or 308 in FIG. 3A. Referring to FIG. 3B, in 322, the process may include receiving a restoration time window, and in 324, retrieving forecasted weather data for the geographical area that includes the group of transmission assets that are to be restored. In 326, the system may compare geographical locations of forecasted severe weather to geographical locations of transmission assets, as well as timing information of the forecasted weather, to identify geographic regions that are affected by severe weather, and in 328, the system may further drill down and use the same information to identify particular assets that are affected by severe weather.

In 330, the system may also receive crew inspections about the vulnerability of the selected group of transmission assets, and generate an order of transmission assets to be restored, and timing information for the restoration events. The system may also provide a user interface 340 which enables a user to manipulate or manually override any ordering and a final restoration plan can be output in 332 with a sequence of transmission assets to be restored, including an order and timing information. The system may also receive an input via a user interface or some other condition, and send signals to power up the transmission assets according to the output list in 332.

FIGS. 5A-5D illustrate a process of selecting transmission lines for outage or restoration based on severe weather in accordance with example embodiments. In particular, FIG. 5A illustrates a process 500 of selecting a section of a power grid for outage or restoration analysis based on severe weather. Here, the host system may auto-select the grid section or may receive the selection manually via a user interface, etc.

FIG. 5B illustrates a process 510 of identifying a region 512 (or regions) within the section of the power grid that is forecasted to experience severe weather in the future. The host system may use geographical coordinates or other attributes within the weather forecast to identify the geographical areas on the power grid which will be affected by severe weather.

FIG. 5C illustrates a process 520 of identifying transmission assets 522, 524, 526, and 528 that are going to be affected by the severe weather. Here, the host system may identify which transmission assets are located in the region 512 identified in FIG. 5B. It is not necessary for an entire delivery region of the transmission asset to be located under severe weather. If any part of the line is under sever weather, it may be added to the list.

FIG. 5D illustrates a process 530 of identifying an ordered sequence of transmission lines for outage 532, 534, 536, and 538. The order may be determined based on timing information and geographical information in the weather forecast. That is, the host system may analyze the timing information of the severe weather to identify an order in which the transmission lines need to be outaged or restored.

Figure 7:
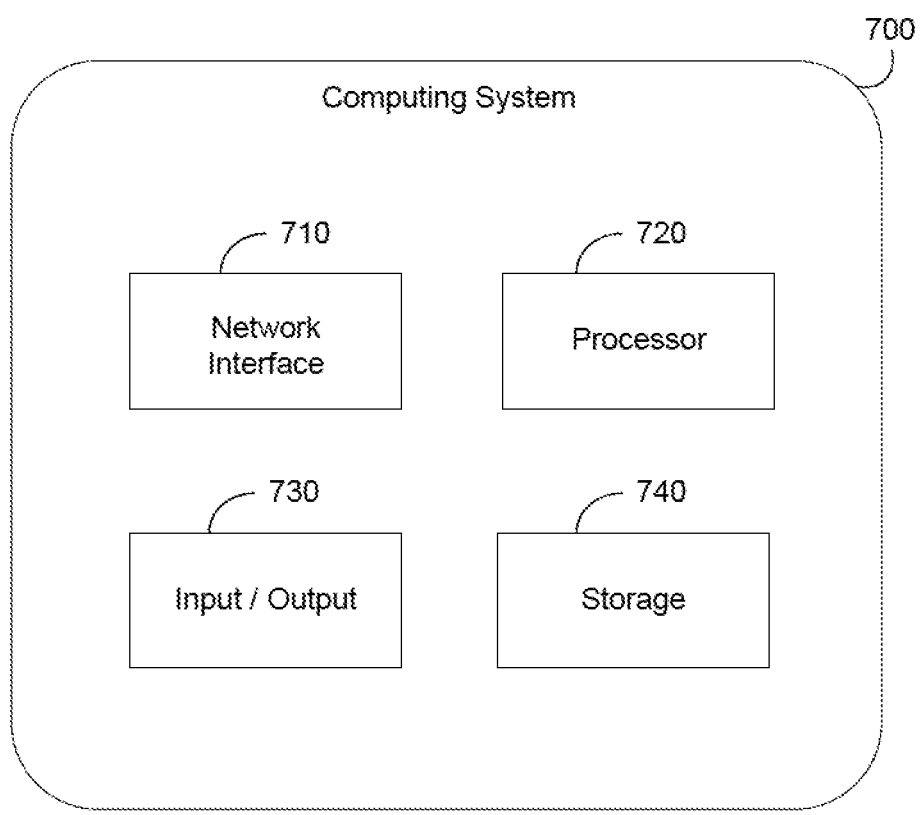
FIG. 7 is a diagram illustrating a computing system for use in the examples herein in accordance with an example embodiment.

FIG. 6 illustrates a method 600 of determining an outage sequence for a group of transmission assets in accordance with an example embodiment. For example, the method 600 may be performed by a computing system such as shown in FIG. 7. The computing system may include a web server, a cloud platform, a control center, an energy management system (EMS), a personal computer, a mobile device, or the like. Referring to FIG. 6, in 610, the method may include selecting a group of transmission assets of a power grid for outage. For example, the group may be selected from a software program that determines which areas of the grid are to be outed during an emergency.

In 620, the method may include receiving forecasted weather conditions for a geospatial area that includes the group of transmission assets. In 630, the method may include determining an outage priority among the group of transmission assets based on geospatial locations of the forecasted weather conditions and geospatial locations of the group of transmission assets. In 640, the method may include generating a sequence of instructions for powering down the group of transmission assets based on the determined outage priority among the group of transmission assets and storing the sequence of instructions in memory.

In some embodiments, the method may further include receiving an input via a user interface and powering down the group of transmission assets based on the generated sequence of instructions. In some embodiments, the method may further include receiving inspection reports from one or more ground crews in association with the group of transmission assets of the power grid and determining the outage priority among the group of transmission assets based on the inspection reports from the one or more ground crews. In some embodiments, the method may further include determining the outage priority based on predefined critical loads that receive power from the group of transmission assets.

In some embodiments, the determining may include detecting a subset of transmission assets within the group of transmission assets that are forecasted to receive severe weather and determining the outage priority based on the detected subset of transmission assets. In some embodiments, the determining may further include determining the outage priority based on a forecasted start time of the severe weather at each transmission asset in the detected subset of transmission assets. In some embodiments, the method may further include determining a restoration priority among the group of transmission assets based on the geospatial locations of the forecasted weather conditions and the geospatial locations of the group of transmission assets. In some embodiments, the method may further include generating a sequence of instructions for restoring the group of transmission assets based on the determined restoration priority among the group of transmission assets and storing the restoration plan in memory.

FIG. 7 illustrates a computing system 700 that may be used in any of the methods and processes described herein, in accordance with an example embodiment. For example, the computing system 700 may be a database node, a server, a cloud platform, or the like. In some embodiments, the computing system 700 may be distributed across multiple computing devices such as multiple database nodes. Referring to FIG. 7, the computing system 700 includes a network interface 710, a processor 720, an input/output 730, and a storage device 740 such as an in-memory storage, and the like. Although not shown in FIG. 7, the computing system 700 may also include or be electronically connected to other components such as a display, an input unit(s), a receiver, a transmitter, a persistent disk, and the like. The processor 720 may control the other components of the computing system 700.

The network interface 710 may transmit and receive data over a network such as the Internet, a private network, a public network, an enterprise network, and the like. The network interface 710 may be a wireless interface, a wired interface, or a combination thereof. The processor 720 may include one or more processing devices each including one or more processing cores. In some examples, the processor 720 is a multicore processor or a plurality of multicore processors. Also, the processor 720 may be fixed or it may be reconfigurable. The input/output 730 may include an interface, a port, a cable, a bus, a board, a wire, and the like, for inputting and outputting data to and from the computing system 700. For example, data may be output to an embedded display of the computing system 700, an externally connected display, a display connected to the cloud, another device, and the like. The network interface 710, the input/output 730, the storage 740, or a combination thereof, may interact with applications executing on other devices.

The storage device 740 is not limited to a particular storage device and may include any known memory device such as RAM, ROM, hard disk, and the like, and may or may not be included within a database system, a cloud environment, a web server, or the like. The storage 740 may store software modules or other instructions which can be executed by the processor 720 to perform the method shown in FIG. 4. According to various embodiments, the storage 740 may include a data store having a plurality of tables, records, partitions and sub-partitions. The storage 740 may be used to store database records, documents, entries, and the like.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non-transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, external drive, semiconductor memory such as read-only memory (ROM), random-access memory (RAM), and/or any other non-transitory transmitting and/or receiving medium such as the Internet, cloud storage, the Internet of Things (IoT), or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A computing system comprising:
    a memory; and
    a processor configured to
        select a group of transmission assets of a power grid for outage;
        receive forecasted weather conditions for a geospatial area that includes the group of transmission assets;
        determine an outage time and priority among the group of transmission assets based on geospatial locations of the forecasted weather conditions and geospatial locations of the group of transmission assets, wherein the priority is an order in which transmission assets in the group will be powered down;
        generate a sequence of instructions for powering down the group of transmission assets based on the determined outage time and priority among the group of transmission assets and storing the sequence of instructions in the memory; and
        power down the group of transmission assets in response to received signals based on the generated sequence of instructions.

2. The computing system of claim 1, wherein the processor is further configured to receive an input from a user interface and power down the group of transmission assets based on the generated sequence of instructions.

3. The computing system of claim 1, wherein the processor is further configured to receive inspection reports from one or more ground crews in association with the group of transmission assets of the power grid and determine the outage priority among the group of transmission assets based on the inspection reports from the one or more ground crews.

4. The computing system of claim 1, wherein the processor is further configured to determine the outage priority based on predefined critical loads that receive power from the group of transmission assets.

5. The computing system of claim 1, wherein the processor is further configured to detect a subset of transmission assets within the group of transmission assets that are forecasted to receive severe weather and determine the outage priority based on the detected subset of transmission assets.

6. The computing system of claim 5, wherein the processor is further configured to determine the outage priority based on a forecasted start time of the severe weather at each transmission asset in the detected subset of transmission assets.

7. The computing system of claim 1, wherein the processor is further configured to determine a restoration priority among the group of transmission assets based on the geospatial locations of the forecasted weather conditions and the geospatial locations of the group of transmission assets.

8. The computing system of claim 7, wherein the processor is further configured to generate a sequence of instructions for restoring the group of transmission assets based on the determined restoration priority among the group of transmission assets and store a restoration plan in the memory.

9. The computing system of claim 1, wherein the processor is further configured to:
assign weights to a plurality of attributes included in the determination of priority among the group of transmission assets.

10. A method comprising:
selecting a group of transmission assets of a power grid for outage;
receiving forecasted weather conditions for a geospatial area that includes the group of transmission assets;
determining an outage time and priority among the group of transmission assets based on geospatial locations of the forecasted weather conditions and geospatial locations of the group of transmission assets, wherein the priority is an order in which transmission assets in the group will be powered down;
generating a sequence of instructions for powering down the group of transmission assets based on the determined outage time and priority among the group of transmission assets and storing the sequence of instructions in memory; and
powering down the group of transmission assets in response to received signals based on the generated sequence of instructions.

11. The method of claim 10, wherein the method further comprises receiving an input via a user interface and powering down the group of transmission assets based on the generated sequence of instructions.

12. The method of claim 10, wherein the method further comprises receiving inspection reports from one or more ground crews in association with the group of transmission assets of the power grid and determining the outage time and priority among the group of transmission assets based on the inspection reports from the one or more ground crews.

13. The method of claim 10, wherein the method further comprises determining the outage time and priority based on predefined critical loads that receive power from the group of transmission assets.

14. The method of claim 10, wherein the determining comprises detecting a subset of transmission assets within the group of transmission assets that are forecasted to receive severe weather and determining the outage priority based on the detected subset of transmission assets.

15. The method of claim 14, wherein the determining further comprises determining the outage time and priority based on a forecasted start time of the severe weather at each transmission asset in the detected subset of transmission assets.

16. The method of claim 10, wherein the method further comprises determining a restoration time and priority among the group of transmission assets based on the geospatial locations of the forecasted weather conditions and the geospatial locations of the group of transmission assets.

17. The method of claim 16, wherein the method further comprises generating a sequence of instructions for restoring the group of transmission assets based on the determined restoration time and priority among the group of transmission assets and storing a restoration plan in memory.

18. A non-transitory computer-readable storage medium comprising instructions which when executed by a processor cause a computer to perform a method comprising:
selecting a group of transmission assets of a power grid for outage;
receiving forecasted weather conditions for a geospatial area that includes the group of transmission assets;
determining an outage time and priority among the group of transmission assets based on geospatial locations of the forecasted weather conditions and geospatial locations of the group of transmission assets, wherein the priority is an order in which transmission assets in the group will be powered down;
generating a sequence of instructions for powering down the group of transmission assets based on the determined outage time and priority among the group of transmission assets and storing the sequence of instructions in memory;
generating a sequence of instructions for restoring the group of transmission assets based on the determined restoration time and priority among the group of transmission assets and storing a restoration plan in memory; and
powering down the group of transmission assets in response to received signals based on the generated sequence of instructions.

19. The non-transitory computer-readable storage medium of claim 18, wherein the method further comprises receiving inspection reports from one or more ground crews in association with the group of transmission assets of the power grid and determining the outage priority among the group of transmission assets based on the inspection reports from the one or more ground crews.

20. The non-transitory computer-readable storage medium of claim 18, wherein the method further comprises determining the outage priority based on predefined critical loads that receive power from the group of transmission assets.

* * * * *